United States Patent [19]
Deneault et al.

[11] Patent Number: 5,402,714
[45] Date of Patent: Apr. 4, 1995

[54] FORK SEGREGATING FONDUE POT PARTITIONING ARRAY

[76] Inventors: Robert Deneault, 6659 Des Ecores, Montréal, Canada, H2G 2J8; Pierre Vigneault, 8590 Chaminade, St-Léonard, QC, CDA, Canada, H1P 2K7

[21] Appl. No.: 92,869

[22] Filed: Jul. 19, 1993

[51] Int. Cl.[6] .................. A47J 27/04; A47J 27/10; A47J 37/12
[52] U.S. Cl. .................. 99/416; 99/415; 99/418; 99/448; 99/450; 126/369; 220/529; 220/553; 220/912
[58] Field of Search .......... 99/403, 410–417, 99/419, 448, 450; 126/43, 110, 369, 689; 219/432, 429, 459; 220/529, 553–555, 759, 912

[56] References Cited

U.S. PATENT DOCUMENTS

| | | | |
|---|---|---|---|
| 1,630,787 | 5/1927 | Cullen | 220/912 |
| 1,745,592 | 2/1930 | White | 99/448 |
| 1,791,889 | 2/1931 | Duncan | 220/912 |
| 1,909,983 | 5/1933 | Powell | 99/415 |
| 2,123,359 | 7/1938 | Hallmark | 220/553 |
| 2,454,054 | 11/1948 | Gibb | 220/529 |
| 2,515,617 | 7/1950 | Tilford | 220/912 |
| 2,546,104 | 3/1951 | MacGregor | 220/912 |
| 2,553,880 | 5/1951 | Stigler | 220/555 |
| 2,597,130 | 5/1952 | Ross | 220/553 |
| 5,154,116 | 10/1992 | Dube | 99/403 |

FOREIGN PATENT DOCUMENTS

| | | | |
|---|---|---|---|
| 0069209 | 5/1949 | Denmark | 220/912 |
| 1432784 | 2/1966 | France | 220/912 |
| 7608833 | 2/1978 | Netherlands | 220/553 |

Primary Examiner—Timothy F. Simone
Attorney, Agent, or Firm—Pierre Lespérance; Francois Martineau

[57] ABSTRACT

A fork segregating partitioning array for use with a fondue pot. The fondue pot is of the type defining a container with a large cavity to receive meltable foodstuff to be warmed by a heating source. The partitioning array consists of a cup member, freely releasably engageable into the container large cavity, and at least two partitioning walls disposed in crossing fashion relative to one another, whereby four distinct subcavities are defined within the cup member. The subcavities are for use in segregating a corresponding number of forks in cooking fondues such as meat fondue or chinese fondue. The cup member is further pierced by a plurality of through-bores, for free passage of the meat soup between the fondue pot and the cup member and vice-versa.

5 Claims, 3 Drawing Sheets

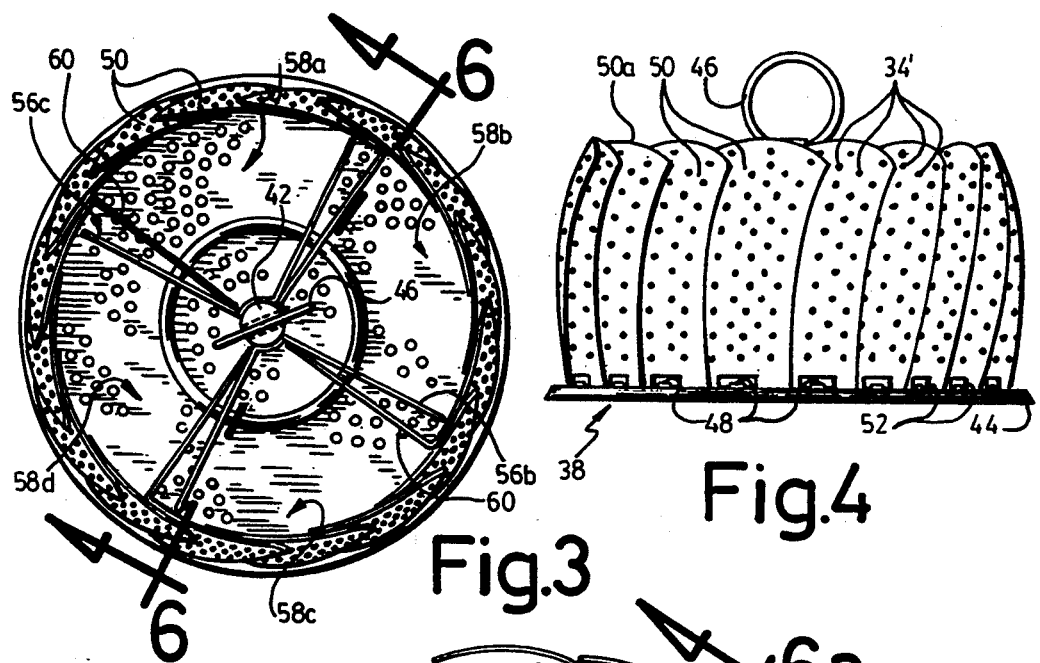
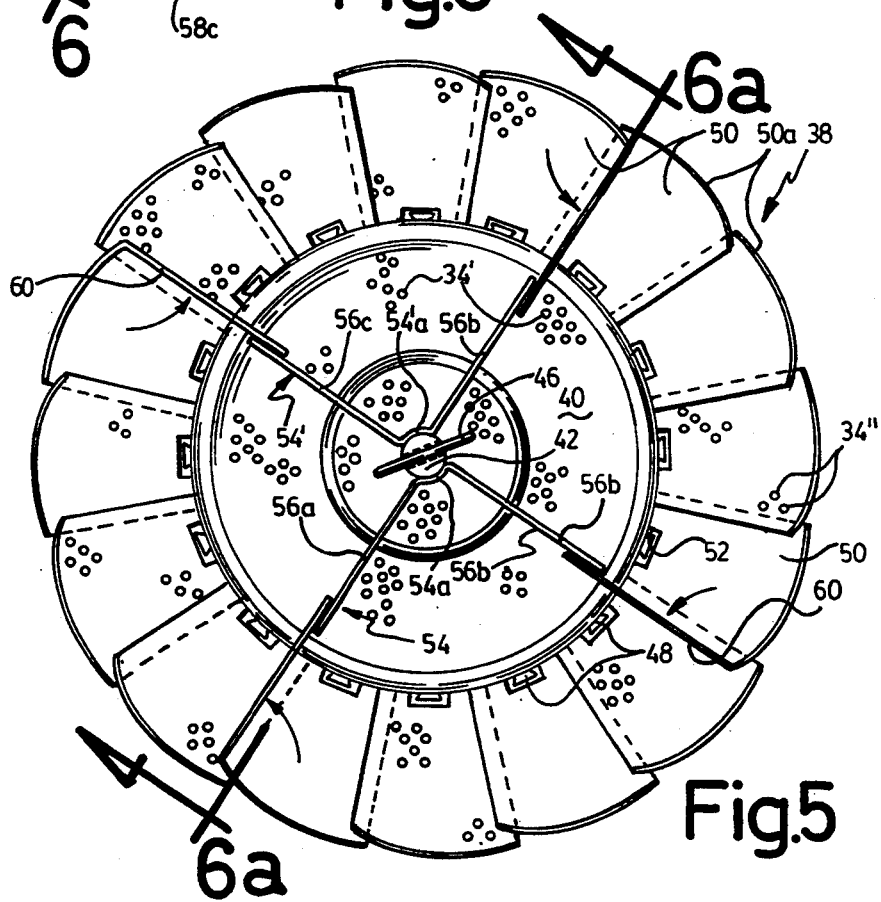

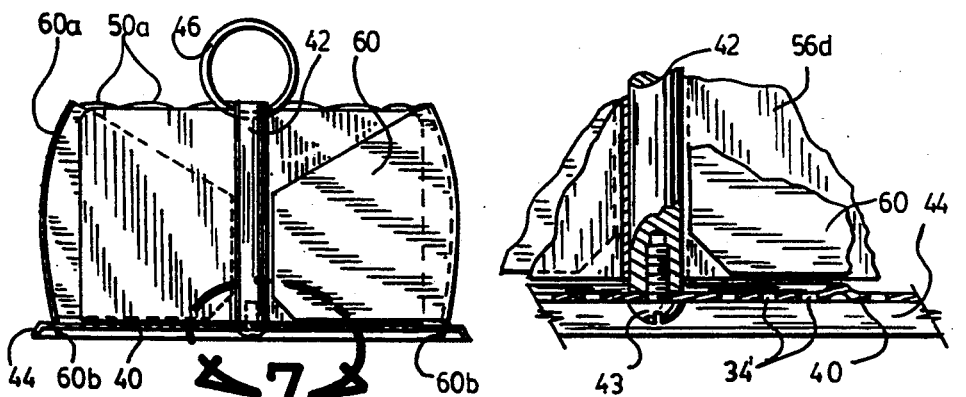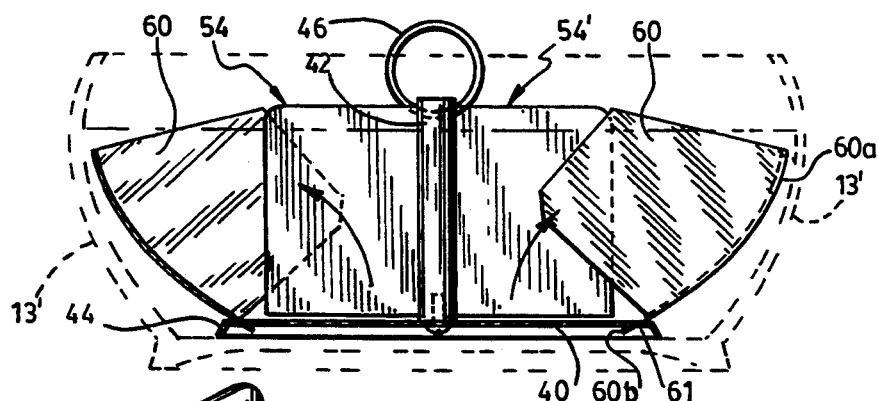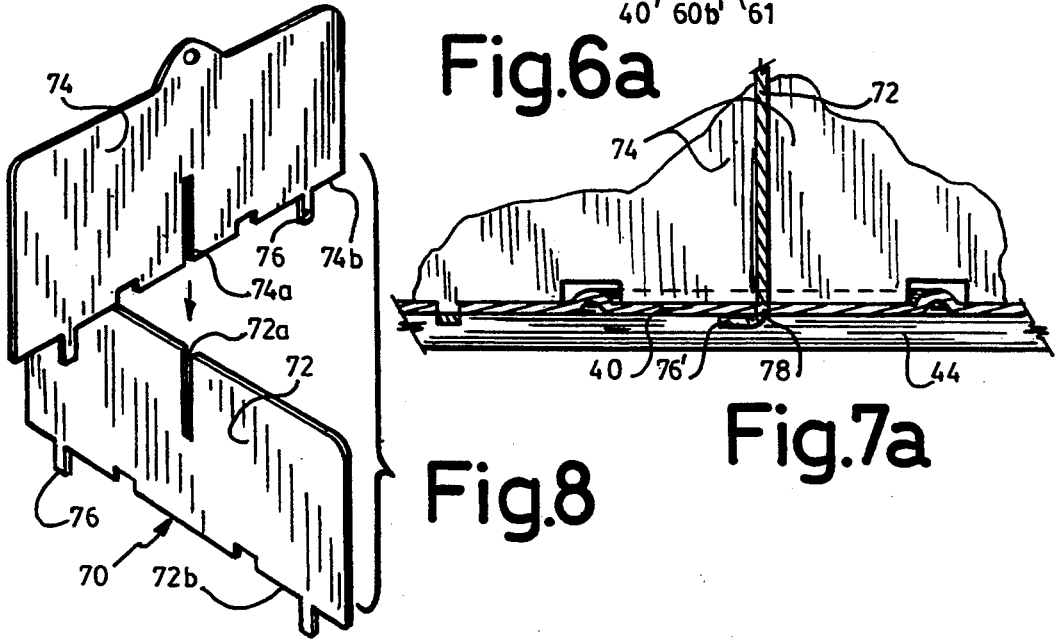

FORK SEGREGATING FONDUE POT PARTITIONING ARRAY

FIELD OF THE INVENTION

This invention relates to kitchen appliances, and particularly to fondue pots.

BACKGROUND OF THE INVENTION

Those that delight on meat fondue parties know that one drawback to be overcome is the accidental loss to the mass of meat soup inside the fondue pot of the vegetables, meat, and the like, carried at the end of that person's fork. Because the meat soup is continuously warmed by the burner located beneath the fondue pot, eddies are created through the meat soup mass, which convey the lost meat (or vegetable) crumb away from its ingress area, for example toward other persons meat crumb meat soup dipping areas. Other concerns include cross-contaminations, whereby a person with flue e.g. could contaminate other healthy persons participating to the fondue party.

OBJECTS OF THE INVENTION

The object of the invention is to address the problem of forks intermingling with one another in meat soup fondue pots, to prevent the accidental loss of meat crumbs from the fork to the fondue mass.

A corollary object of the invention is to provide means to facilitate retrieval of the meat crumb lost to the opaque meat soup mass in the fondue pot, without disturbing the other persons participating to the fondue.

An object of the invention is to prevent cross-contamination between persons in a meat soup fondue party.

SUMMARY OF THE INVENTION

Accordingly with the objects of the invention, there is disclosed a fondue pot having a large cavity for receiving meltable foodstuff to be warmed by a heating source, said fondue pot defining a cup-shaped container circumscribing said large cavity and at least two partitioning walls integrally connected to said container and disposed in crossing fashion relative to one another, whereby said large cavity is divided into four distinct subcavities, said subcavities for use in segregating a corresponding number of forks in meat soup fondues. Alternately, a pair of forks could share the same compartment.

Preferably, said container and said partitioning walls each define a peripheral free edge, whereby said free edges of the container and of the partitioning walls are substantially coplanar.

The invention also relates to a fork segregating partitioning array for use with a fondue pot, said fondue pot of the type defining a container with a large cavity to receive meltable foodstuff to be warmed by a heating source; said partitioning array consisting of a cup member, to be releasably engage into the container large cavity, and at least two partitioning walls disposed in crossing fashion relative to one another, whereby four distinct subcavities are defined within said cup member, said subcavities for use in segregating a corresponding number of forks in meat soup fondues; said cup member being further pierced by a plurality of through-bores, for free passage of said meat soup between said fondue pot and said cup member and vice-versa.

Advantageously, there is provided a U-shape handle member, carried by one of said partitioning walls for facilitating handling of said partitioning array, said partitioning walls being full.

Profitably, said cup member and said partitioning walls each define a peripheral free edge, whereby said free edges of the cup member and of the partitioning walls are substantially coplanar.

It is envisioned that said partitioning walls be integrally connected to one another and to said cup member and that said cup member be of a steamer-like construction, defining a discoid base wall having a central portion and a peripheral edge portion, a shaft projecting transversely from and anchored to said central portion, and a plurality of quadrangular blades edgewisely carried by said peripheral edge portion, said blades edgewisely overlapping one another in successive pairs, and hinge means hingedly interconnecting said blades to said base wall for pivotal movement of said blades between a first limit position, in which said blades extend substantially orthogonally of said base wall and said partition walls abut endwisely against a corresponding number of said partition walls, and a second limit position, in which said blades clear said partition walls and extend approximately coplanar to said discoid base wall radially outwardly thereof.

Profitably, there is provided a ring-like handle member, carried by the end of said shaft opposite said base wall, for facilitating handling of said cup member, said handle member projecting beyond a plane intersecting the ends of said blades opposite said base wall when said blades are in their said first limit positions.

Advantageously, retractable extension members are provided for extending the total radial length of said partition walls adjustably to fondue pots of variable dimensions, said extension members having a radially outward edge to be complementary to that of said fondue pots of variable dimensions.

Preferably, there are two said partition walls, each said partition wall being generally rectangular and defining a transverse slit along one long edge thereof, the two partition walls being releasably engaged in frictional interlocking engagement by insertion of one another through their respective slits. There could also be provided tongue means, integral to said partition walls for releasably anchoring the latter to said base wall in substantially orthogonal fashion relative thereto.

BRIEF DESCRIPTION OF THE DRAWINGS

FIG. 3 is a top plan view of a third embodiment of the invention, showing a hinged wall steamer in closed condition and provided with an integral fork segregating partitioning array;

FIG. 4 is an elevation of the present invention steamer of FIG. 3;

FIG. 5 is a top plan view of the steamer of FIG. 3, in fully opened condition;

FIGS. 6–6a are cross-sectional views taken along lines 6–6 of FIG. 3 and 6a–6a of FIG. 5, with the partitioning walls extension flaps being respectively retracted and extended;

FIG. 7 is a view at an enlarged scale of area 7 in FIG. 6; FIG. 7a is a view similar to that of FIG. 7 but showing still another alternate embodiment of the invention, in which the partitioning array is of the dismantleable type; and FIG. 8 is an exploded view of the dismantleable partitioning array of the invention.

DETAILED DESCRIPTION OF THE INVENTION

Figure 1:
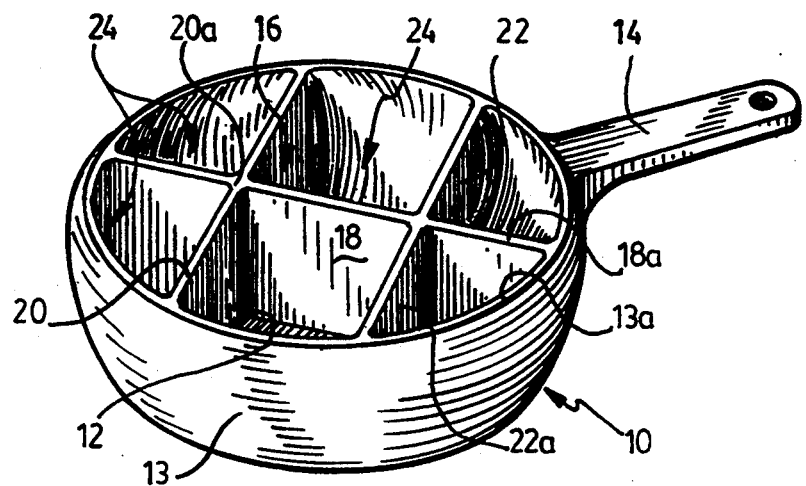
FIG. 1 is a perspective view of a first embodiment of the invention, showing a fondue pot with the integral fork-segregating partitioning array.

Fondue pot 10, illustrated in FIG. 1, consists of a container part having a base wall 12 and a side wall 13, a handle 14 transversely projecting outwardly from the side wall 13, and a partitioning array 16 integrally mounted over the base wall 12 and circumscribed by the side wall 13. Partitioning array 16 includes e.g. a first rectangular panel 18 disposed orthogonally relative to second and third parallel spaced panels 20 and 22, the panels 18–22 each being edgewisely anchored to the base wall 12 and to the side walls 13, whereby six cavities 24 are formed. (A tic-tac-toe like arrangement is obtained, when viewed in top plan view) The top free edges 18a, 20a, 22a of panels 18–22 are preferably approximately coplanar to the top edge 13a of the pot side wall 13.

In use, each cavity 24 forms a compartment for receiving a given quantity of meat soup, so that each fork of the party of people (up to six persons in this case) will be dedicated to a corresponding one compartment 24, thus segregating the forks from one another. Such fork segregation is desirable, not only to prevent cross-contamination between different persons, but also to prevent one fork from accidentally dislodging the meat crumb embroached by another fork, to the dismay of the fondue party of persons. Moreover, any meat crumb lost to the meat soup inside a given compartment 24 should also further be more easily retrieved, without the need for the other forks to be removed from the meat soup mass, since the meat crumb will always remain within its dedicated compartment.

Figure 2:
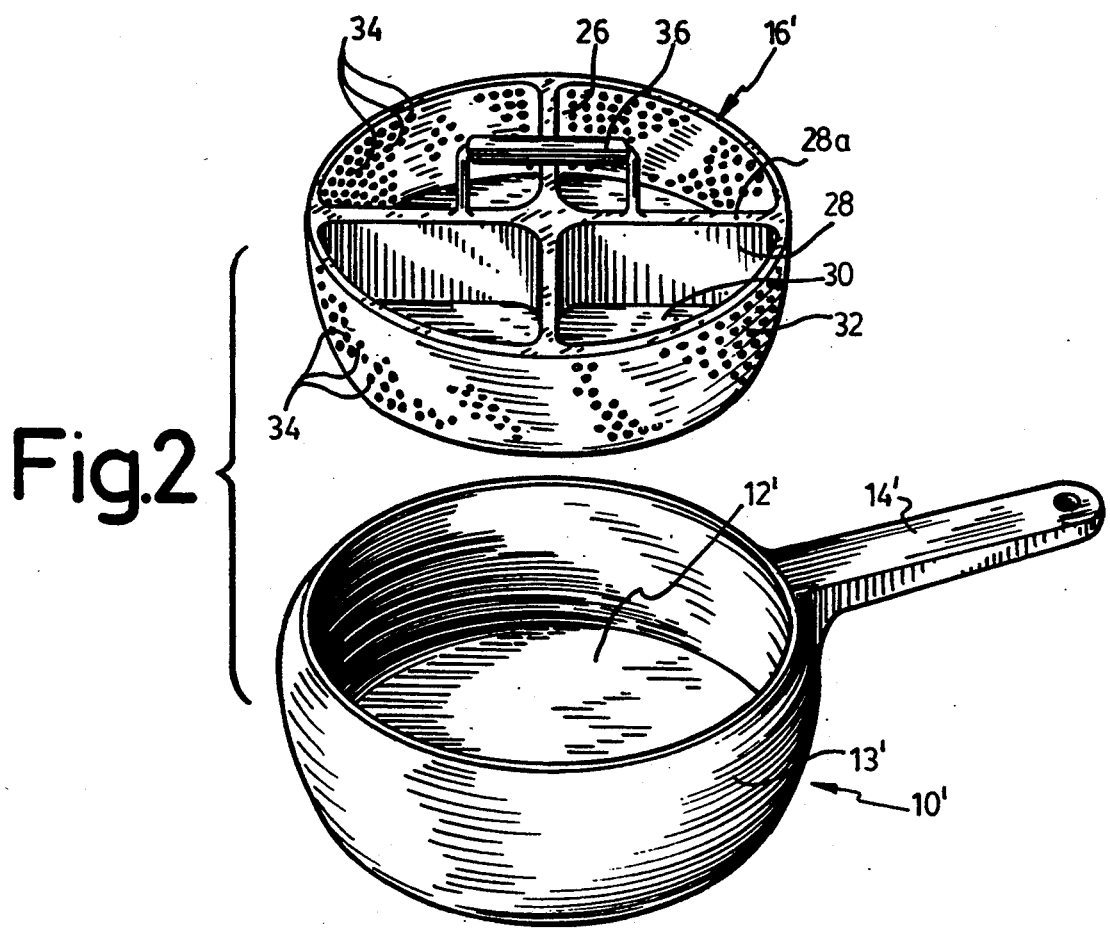
FIG. 2 is an exploded view of a second embodiment of the invention, showing a fondue pot with a removable complementarily shaped fixed wall steamer having an integral fork segregating partitioning array.

In the alternate embodiment illustrated in FIG. 2, the fondue pot 10' includes a conventional container with base wall 12', handle 14' and side wall 13' but with a modified free partitioning array 16' being releasably engageable over the base wall 12'. Each fondue pot container 12–14 and 12'–14', is of the type to be supported over a fuel burner by a conventional open stand. Partitioning array 16' includes a + shaped arrangement made from a pair of rectangular panels 26, 28, merging at their crossing point, a full discoid base wall 30 edgewisely integral to the long edges of the panels 26 and 28, and an annular wall 32 edgewisely depending from discoid wall 30 and joining the four peripheral ends of panels 26 and 28. Annular wall 32 is pierced by a plurality of small bores 34 whereby meat soup is flowable through bores 34. Preferably, the top edge of one partitioning wall, e.g. top edge 28a of partitioning wall 28, integrally carries the two legs of a thermally insulated U-shape handle, 36.

It is understood that container 30, 32, forms a generally open fondue meat soup containing basket of a construction similar to that of a steamer, of a radially outward shape complementary to that of the enclosure of fondue pot 12', 13', so as to snugly fit therein. Basket 30, 32, thus includes four "pockets", i.e. the four compartments defined by full partitioning walls 28.

Thermally insulated handle 36 enables convenient engagement into and disengagement from the fondue pot 12', 13' of partitioning array 16, to facilitate retrieval of meat crumbs lost to the meat soup mass. Indeed, because of the plurality of through-bores 34 in steamer-like member 16', meat soup within any one of the four compartments of the steamer-like member 16' will escape therefrom to the fondue pot 12', 13', whenever the member 16' is lifted with handle 36 away from the fondue pot 12', 13'—as when to retrieve lost meat crumbs from a cavity of the partitioning array 16'.

FIGS. 3–5, 6–6a and 7–7a illustrate a third embodiment of the invention, namely, a vegetable steamer-like container 38. The main body of open container 38 is of well known construction, including a flat discoid base wall 40 from the center of which orthogonally projects an upright shaft 42, this shaft 42 being anchored to wall 40 by suitable anchoring means, e.g. by an axial bolt 43 (FIG. 7). The radially external circular edge of the discoid wall 40 forms a downturned annular flange 44 constituting a foot supporting discoid wall 40 spacedly over a supporting (e.g. kitchen cupboard) platform. Discoid wall 40 includes a number of large apertures, (not illustrated, but conventional) proximate radially external flange 44. A small, dovetail-shape ear 48, integral to base wall 40, projects radially outwardly through each said large aperture and slightly transversely (downwardly) from the plane of flat base wall 40.

A plurality of quadrangular blades 50, are edgewisely hinged to corresponding ears 48 about complementary apertures 52, made at the radially inner end portion of each blade 50, all around the circumference of the steamer 38. Successive pairs of blades 50, which blades are of concave shape from a radially inward perspective of the steamer 38, are in overlapping relation, whereby, as is known in the art, radially inward forcible hinged displacement of one blade 50 brings therewith all the other blades to a "closed" condition, illustrated in FIG. 4, where all blades are substantially upright (orthogonal to base plate 40), relative to a fully "opened" condition, illustrated in FIG. 5, in which all the blades 50 are approximately coplanar to base wall 40.

Base wall 40 and blades 50 are pierced by a plurality of meat soup flowable through-bores, 34', 34'', respectively. Central shaft 42 preferably comprises a projecting ring 46 at its top end, and preferably is of cylindrical shape. Ring 46 projects upwardly beyond the plane intersecting the top edges 50a of the blades 50 in their upright, closed condition illustrated in FIG. 4. Ring 46 forms a finger-handle, to facilitate handling of steamer 38.

According to the invention, steamer 38, in its closed condition of FIGS. 3–4, is to be of a shape complementary to that of the enclosure or inner cavity of fondue pot 12', 13' from FIG. 2, so as to be destined to snugly fit therein. A pair of V-shaped panels 54, 54', are both anchored at their apices to upright shaft 42, transversely over base wall 40 so as to be substantially parallel to shaft 42, whereby four substantially equidistant partitioning walls 56a, 56b, 56c and 56d are obtained. When blades 50 are in their closed condition, four compartments 58a–58d (FIG. 3) are accordingly formed by the partitioning walls 56a–56d and upright blades 50. Preferably, and as best seen in FIG. 5, the apex of each panel 54, 54', at 54a, 54'a is radially inwardly concavely shaped, to match the contour of a registering portion of the circumference of cylindrical shaft 42.

It is understood that partitioning walls 56a–56d will be fully effective only when blades 50 are closed (upright). The reason for this is that, in a partially closed condition of the radially outward blades, there will be a gap between the radially outward edges of partition walls 56a–56d, and the corresponding registering blades 50. This gap in turn will not prevent meat soup from one compartment 58a–58d to flow to another compartment 58a–58d, thus potentially transferring therewith one meat crumb from one to another compartment 58a–58d. Such gap would therefore decrease the efficiency of the present partitioning array. But it would however still be effective in its fork segregating feature. This means in practice that the steamer member 38 will be limited for complete fork segregation to a single fondue pot format.

On the other hand, it would be desirable to envision a steamer member 38 with a fork segregating partitioning array of adjustable dimensions, to fit fondue pots of variable diameters. With this contingency in mind, and as best illustrated in FIG. 6a, the present inventor has developed a system of radially outwardly extendable flap extensions, 60, for temporarily extending the overall radial length of the partitioning walls 56a–56d, there being one flap for each partition 56a, 56b, 56c, 56d. Each flap 60 is of approximately quadrangular shape, but with the radially outward edge thereof, 60a, being preferably convexly shaped to substantially conform to the conventionally arcuate shape of the fondue pot side wall 13'. Each flap 60 is hingedly secured to the bottom wall 40 at its radially outwardly bottom corner by a hinge means, 60b, i.e. at the bottom end of arcuate radially outward edge 60a. As suggested by FIGS. 6–6a, hinge means 60b may be e.g. a tongue, projecting from flap 60 coextensively from arcuate edge 60a, and engaging an aperture 61 made in bottom wall 40 proximate the flange 44 thereof.

Hence, as suggested by the arrows in FIG. 6a, extension of each flap 60 is made by tilting same upwardly and radially outwardly about hinge means 60b. Flaps 60 are extensible to a variable degree, to match fondue pots of variable inner diameters, whereby accidental cross-flow of meat soup or the like fluid between any two compartments is substantially prevented. It is understood that, since each flap 60 is individually adjustable i.e. radially outwardly extensible relative to shaft 42, via its distinct hinge means 60b, the four flaps 60 provide a self-centering capability to the partitioning array.

FIGS. 7a and 8 show a fourth embodiment of partitioning array, 70. In this alternate embodiment, preferred by the present inventor, the upright shaft 42 is redundant and thus cancelled. The partitioning array 70 is characterized in that it is dismantleable, i.e. that the two partitioning walls 72 and 74 that constitute such array 70 are releasably interconnected, contrary to the three previously described embodiments of partitioning arrays. Each partitioning wall 72, 74, is generally rectangular and defines a transverse slit 72a, 74a, forming a cavity opening transversely of the bottom long edge 72b, 74b, thereof. Panels 72, 74 are interengageable through their slits 72a, 74a, for releasable frictional interlocking engagement in a substantially + shape fashion. The bottom long edges 72b, 74b further include a few coextensive, semi-rigid, bendable projecting tongues, 76, e.g., two tongues 76, these tongues releasably engaging registering apertures 78 made in bottom wall 40. As suggested at FIG. 7a, by bending by a quarter of a turn the portion of tongues 76 projecting downwardly of wall 40, against the underface of wall 40, as 76', partitions 72 and 74 become integrally connected to wall 40 by a hooking engagement therewith. Therefore, four distinct compartments are achieved between the successive pairs of wall sections of partitions 72 and 74, for fork segregation.

It is understood that the material constituting the fork-segregating partitioning arrays of each of the four above-described embodiments of the invention, should be made from a suitable rigid material being non degradable by meat soup or water vapour, e.g. stainless steel, polypropylene, or the like. It is also understood that the exact number of compartments is envisioned to be variable; i.e., it would be well within the scope of the present invention to provide less than four partitioning walls, e.g. two or three, or more than four, e.g. six or eight. The important feature to maintain is that a number of compartments be defined, to enable fork segregation within a meat soup bath.

I claim:

1. A fork segregating partitioning array for use with a fondue pot, said fondue pot of the type defining a container with a large cavity to receive meat soup and meat crumbs foodstuff to be warmed by a heating source; said partitioning array consisting of a cup member, destined to releasably engage into the container large cavity, and at least two partitioning walls, each partitioning wall having an intermediate transverse slit, whereby both partitioning walls are interengageable through their slits in a substantially "+" shape fashions, whereby four distinct subcavities are defined within said cup member, said subcavities for use in segregating a corresponding number of fondue forks; said cup member being further pierced by a plurality of through-bores exclusively of said partitioning walls, for free flow of said meat soup between said fondue pot and said cup member and vice-versa, while substantially preventing cross-flow of said meat crumbs between any two said subcavities;

wherein said partitioning walls are integrally connected to one another and to said cup member and wherein said cup member is of a steamer-like construction, defining a discoid base wall having a central portion and a peripheral edge portion, a shaft projecting transversely from and anchored to said central portion and a plurality of quadrangular blades edgewisely carried by said peripheral edge portion, all around said base wall, said blades edgewisely overlapping one another in successive pairs, and hinge means hingedly interconnecting said blades to said base wall peripheral edge portion, for pivotal movement of said blades between a first limit position, in which said blades extend substantially orthogonally of said base wall and said partitioning walls abut endwisely against a corresponding number of said blades, and a second limit position, in which said blades clear the radially outer ends of said partitioning walls and extend approximately coplanar to said base wall radially outwardly thereof.

2. A partitioning array as defined in claim 1, further including a ring-like handle member, carried by the end of said shaft opposite said base wall, for facilitating handling of said partitioning array, said handle member projecting beyond a plane intersecting the ends of said blades opposite said base wall when said blades are in their said first limit position.

3. A partitioning array as defined in claim 1, further including retractable extension members, mounted to said partition walls for extending the total radial length of said partition walls adjustably to fondue pots of variable dimensions, said extension members having a radially outward edge of a shape to be complementary to that of said fondue pots of variable dimensions, said extension members further providing self-centering capability to said partition walls within the fondue pot large inner cavity.

4. A fork segregating partitioning array for use with a fondue pot, said fondue pot of the type defining a container with a large cavity to receive meat soup and meat crumbs foodstuff to be warmed by a heating source; and said partitioning array consisting of a cup member, destined to releasably engage into the container large cavity, and at least two partitioning walls, each partitioning wall having an intermediate transverse slit, whereby said partitioning walls are interengageable through their slits for releasable frictional interlocking engagement in a substantially "+" shape fashion, whereby four distinct subcavities are defined within said cup member, said subcavities for use in segregating a corresponding number of fondue forks; said cup member being further pierced by plurality of through-bores exclusively of said partitioning walls, for free flow of said meat soup between said fondue pot and said cup member and vice-versa, while substantially preventing cross-flow of said meat crumbs between any two said subcavities; wherein said cup member is of a steamer-like construction, defining a discoid base wall having a peripheral edge portion, a plurality of quadrangular blades edgewisely carried by said peripheral edge portion, all around said base wall, said blades edgewisely overlapping one another in successive pairs, hinge means hingedly interconnecting said blades to said base wall peripheral edge portion for pivotal movement of said blades between a first limit position, in which said blades extend substantially orthogonally of said base wall and said partitioning walls abut endwisely against a corresponding number of said blades, and a second limit position, in which said blades clear the radially outer ends of said partitioning walls and extend approximately coplanar to said discoid base wall radially outwardly thereof; wherein said partitioning walls are generally rectangular, the two partitioning walls being releasably engaged in frictional interlocking engagement by their insertion of one another through their respective slits.

5. A partitioning array as defined in claim 4, further including tongue means, coextensive and integral to said partition walls for releasably anchoring the latter to said base wall in substantially orthogonal fashion relative thereto.

* * * * *